US011984109B2

(12) United States Patent
Tisch

(10) Patent No.: US 11,984,109 B2
(45) Date of Patent: May 14, 2024

(54) DETECTION AND MITIGATION OF A WIND WHISTLE

(71) Applicant: GoPro, Inc., San Mateo, CA (US)

(72) Inventor: Erich Tisch, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/901,121

(22) Filed: Sep. 1, 2022

(65) Prior Publication Data

US 2024/0078992 A1 Mar. 7, 2024

(51) Int. Cl.
*G10K 11/178* (2006.01)

(52) U.S. Cl.
CPC .. *G10K 11/17821* (2018.01); *G10K 2210/105* (2013.01); *G10K 2210/1051* (2013.01); *G10K 2210/12821* (2013.01); *G10K 2210/3018* (2013.01)

(58) Field of Classification Search
CPC ....... G10K 11/17821; G10K 2210/105; G10K 2210/12821; G10K 2210/1051; G10K 2210/1053; G10K 2210/3018
USPC .......................................................... 381/71.1
See application file for complete search history.

(56) References Cited

U.S. PATENT DOCUMENTS

2007/0033029 A1* 2/2007 Sakawaki ........ G10K 11/17825 704/233
2011/0305345 A1* 12/2011 Bouchard ........... G10L 21/0208 704/226
2019/0043520 A1* 2/2019 Kar ..................... G10L 21/0232
2022/0084494 A1* 3/2022 Chen .................... H04R 1/1083

* cited by examiner

*Primary Examiner* — Paul Kim
*Assistant Examiner* — Douglas J Suthers
(74) *Attorney, Agent, or Firm* — Young Basile Hanlon & MacFarlane, P.C.

(57) ABSTRACT

An image capture device detects a wind whistle using two or more microphones. The image capture device includes a processor that obtains microphone signals from the two or more microphones and measures coherence values between the microphone signals across a frequency band. The frequency band includes frequency bins, and the processor measures a coherence value for each frequency bin. Based on a detection of an elevated coherence value in a frequency bin, the processor determines the presence of a whistle. The processor attenuates the frequency bin based on a determination that the elevated coherence value is above a threshold.

20 Claims, 8 Drawing Sheets

DETECTION AND MITIGATION OF A WIND WHISTLE

TECHNICAL FIELD

This disclosure relates to audio processing. In particular, this disclosure relates to audio processing of a wind whistle caused by geometry features of a device.

BACKGROUND

Whistles can be created by device geometry features as the device travels through wind. These whistles can be detected by the microphones of the device and be unpleasant an unnatural in the recorded audio. In an example, a device, such as an image capture device, may include fins for heat dissipation that can create a whistle when wind blows across the fins. Methods for detecting and mitigating the presence of a whistle are needed.

SUMMARY

Disclosed herein are implementations of a method and apparatus for detecting and mitigating a wind whistle. In an aspect, an image capture device may include a first microphone, a second microphone, and a processor. The processor may be configured to obtain a first microphone signal from the first microphone. The processor may be configured to obtain a second microphone signal from the second microphone. The processor may be configured to measure coherence values between the first microphone signal and the second microphone signal across a frequency band. The frequency band may include frequency bins. The processor may be configured to measure a coherence value for each frequency bin. The processor may be configured to detect an elevated coherence value in a frequency bin. The elevated coherence value may indicate a presence of a whistle. The processor may be configured to attenuate the frequency bin based on a determination that the elevated coherence value is above a threshold.

In an aspect, a method may include obtaining a first microphone signal from a first microphone. The method may include obtaining a second microphone signal from a second microphone. The method may include measuring coherence values between the first microphone signal and the second microphone signal across a frequency band. The frequency band may include frequency bins. The method may include measuring a coherence value for each frequency bin. The method may include detecting an elevated coherence value in a frequency bin. The elevated coherence value may indicate a presence of a whistle. The method may include attenuating the frequency bin based on a determination that the elevated coherence value is above a threshold.

In an aspect, a non-transitory computer-readable medium may include instructions, that when executed by a processor cause the processor to measure coherence values between a first microphone signal and a second microphone signal across a frequency band. The frequency band may include frequency bins. The processor may measure a coherence value for each frequency bin. The processor may detect an elevated coherence value in a frequency bin. The elevated coherence value may indicate a presence of a whistle. The processor may attenuate the frequency bin based on the elevated coherence value.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Devices, such as image capture devices, may include geometry features such as fins for heat dissipation. When wind blows across the fins, the fins can create a whistle that can be detected by one or more of the microphones of the device. The whistle can be an unpleasant and unnatural artifact in the recorded audio.

The implementations described herein include methods and devices configured to detect and attenuate a whistle to provide an improved user experience. The implementations described herein measure a coherence value between two or more microphones. The coherence value is measured per bin and compared against the average coherence value across the full frequency band to detect whether a whistle is present. A whistle is identified when the coherence value of one or more bins deviate from the average coherence value of the full frequency band. Accordingly, it can be determined whether a whistle is present and at which frequency bin the whistle occurs. Based on this information, attenuation can be applied in either the frequency domain by scaling individual bins or in the time domain by adjusting the frequency of a notch filter in real-time.

Figure 1A:
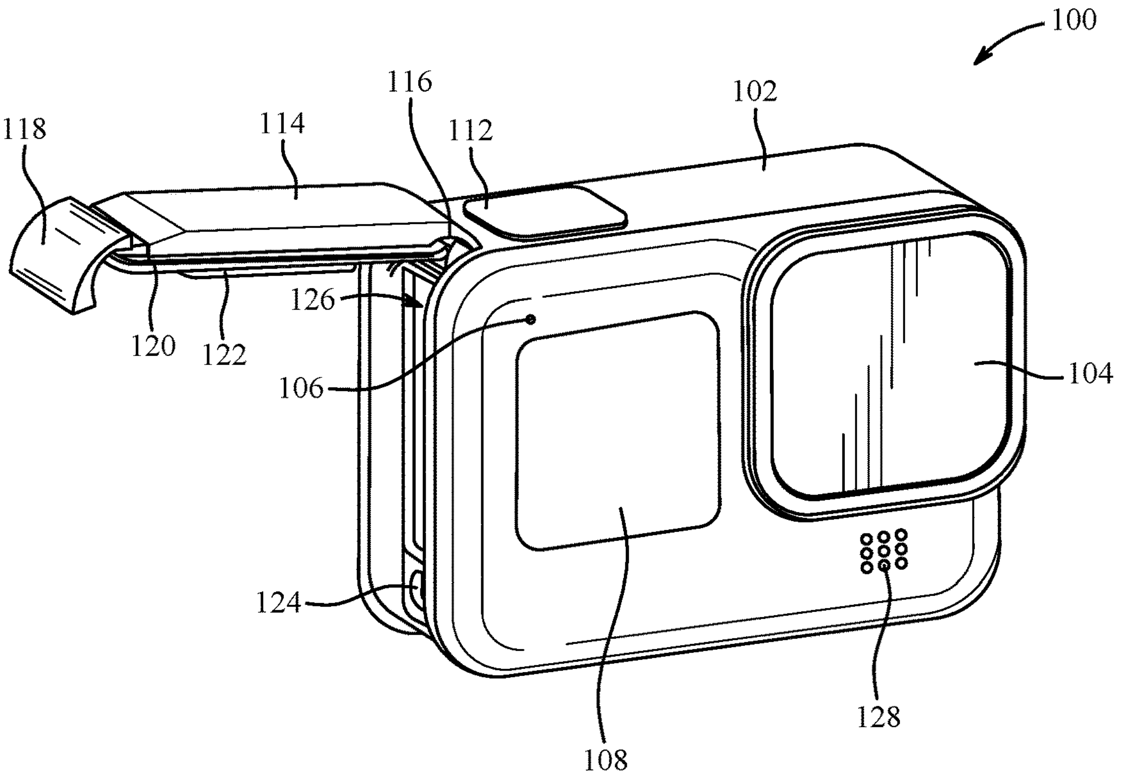
FIGS. 1A-B are isometric views of an example of an image capture device.
Figure 1B:
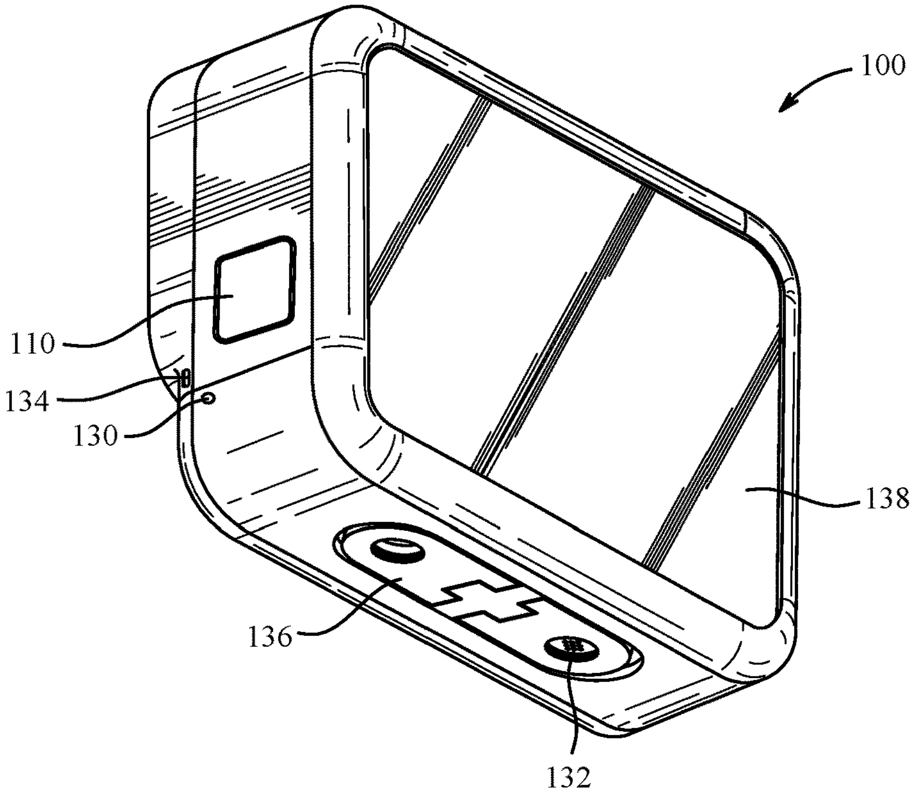

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 6:
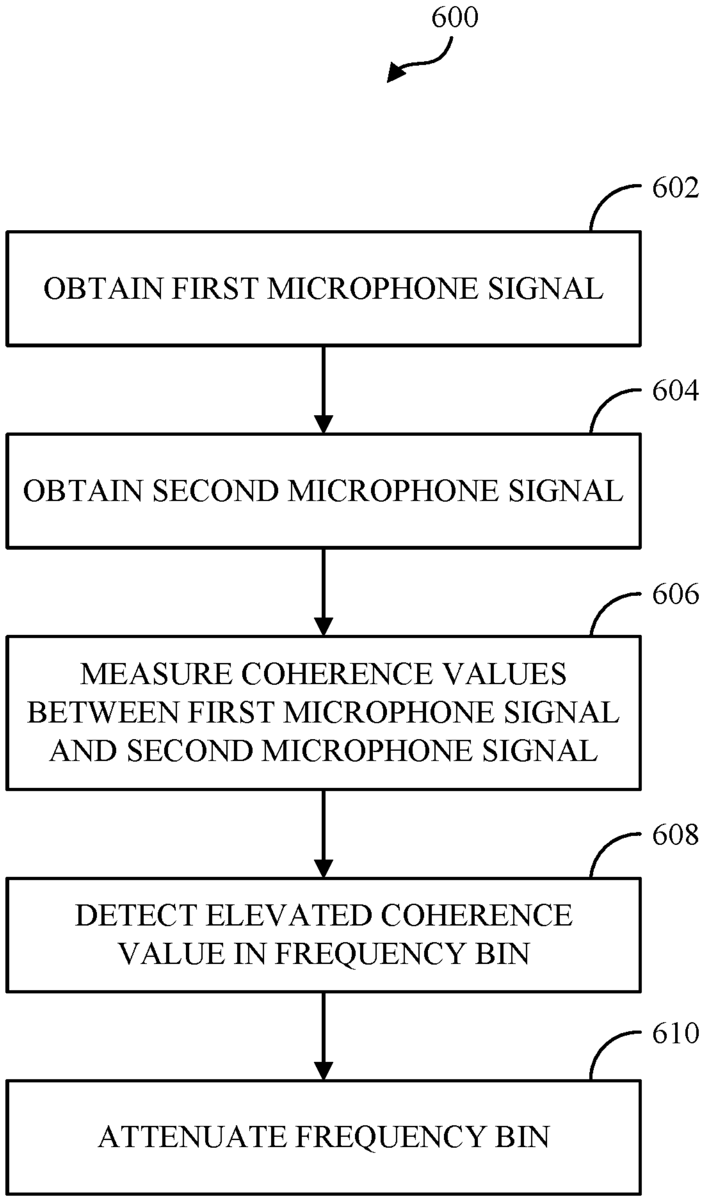
FIG. 6 is a flow diagram of an example of a method for whistle detection.

The image capture device 100 may be used to implement some or all of the techniques described in this disclosure, such as the technique 600 described in FIG. 6.

Figure 2A:
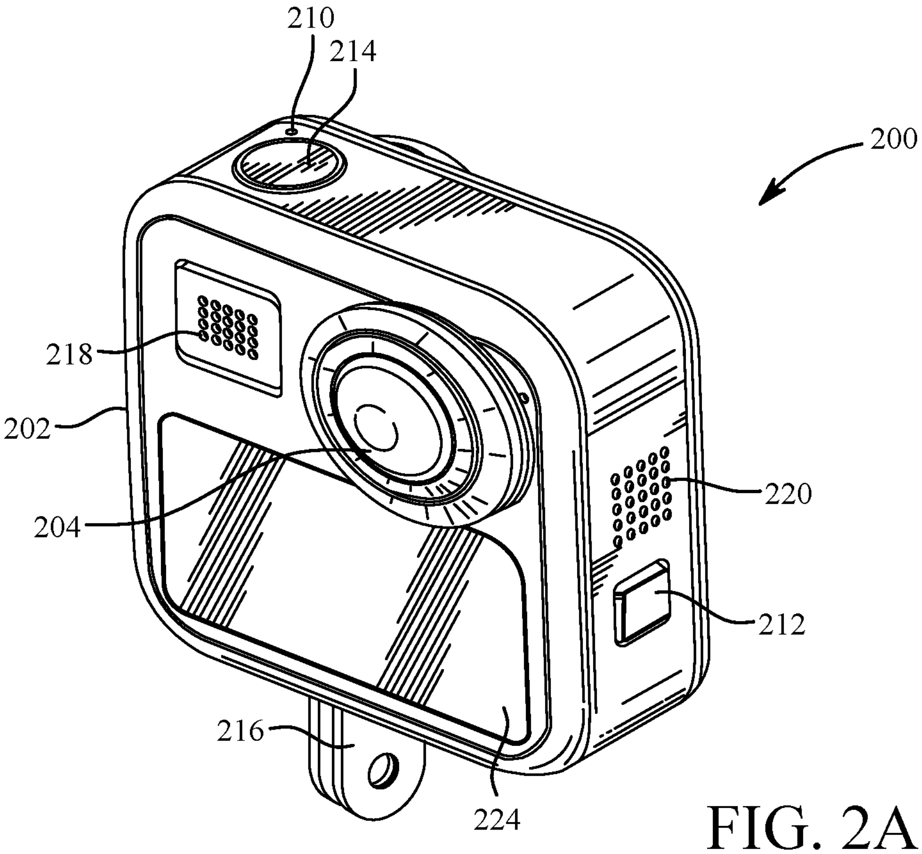
FIGS. 2A-B are isometric views of another example of an image capture device.
Figure 2B:
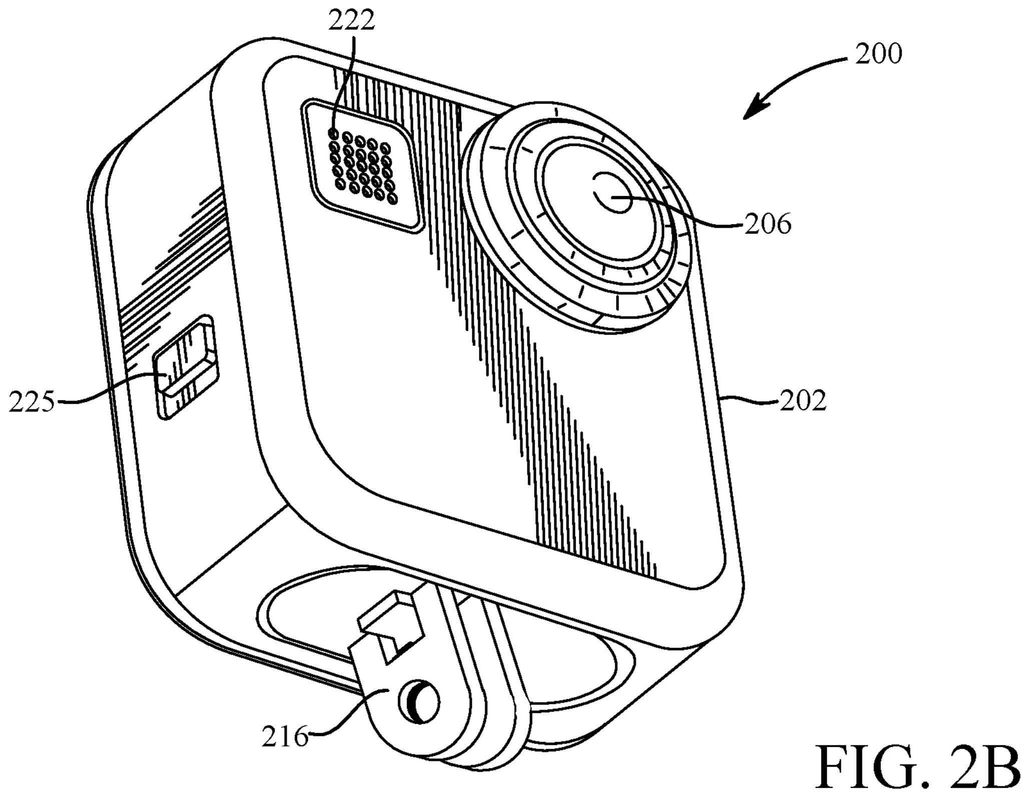

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LED 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

The image capture device 200 may be used to implement some or all of the techniques described in this disclosure, such as the technique 600 described in FIG. 6.

Figure 3:
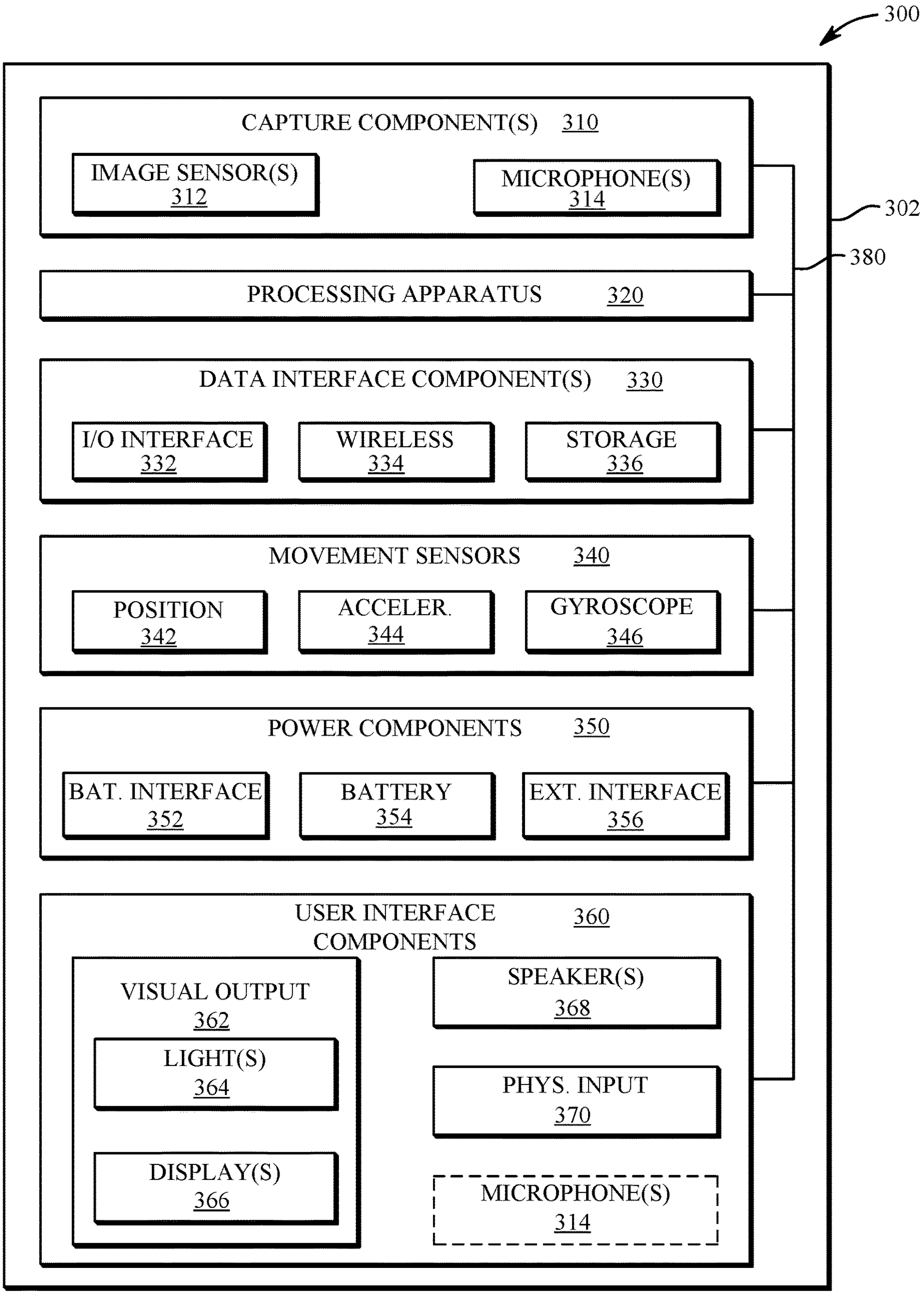
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-B.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal—oxide— semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

The image capture device 300 may be used to implement some or all of the techniques described in this disclosure, such as the technique 600 described in FIG. 6.

Figure 4:
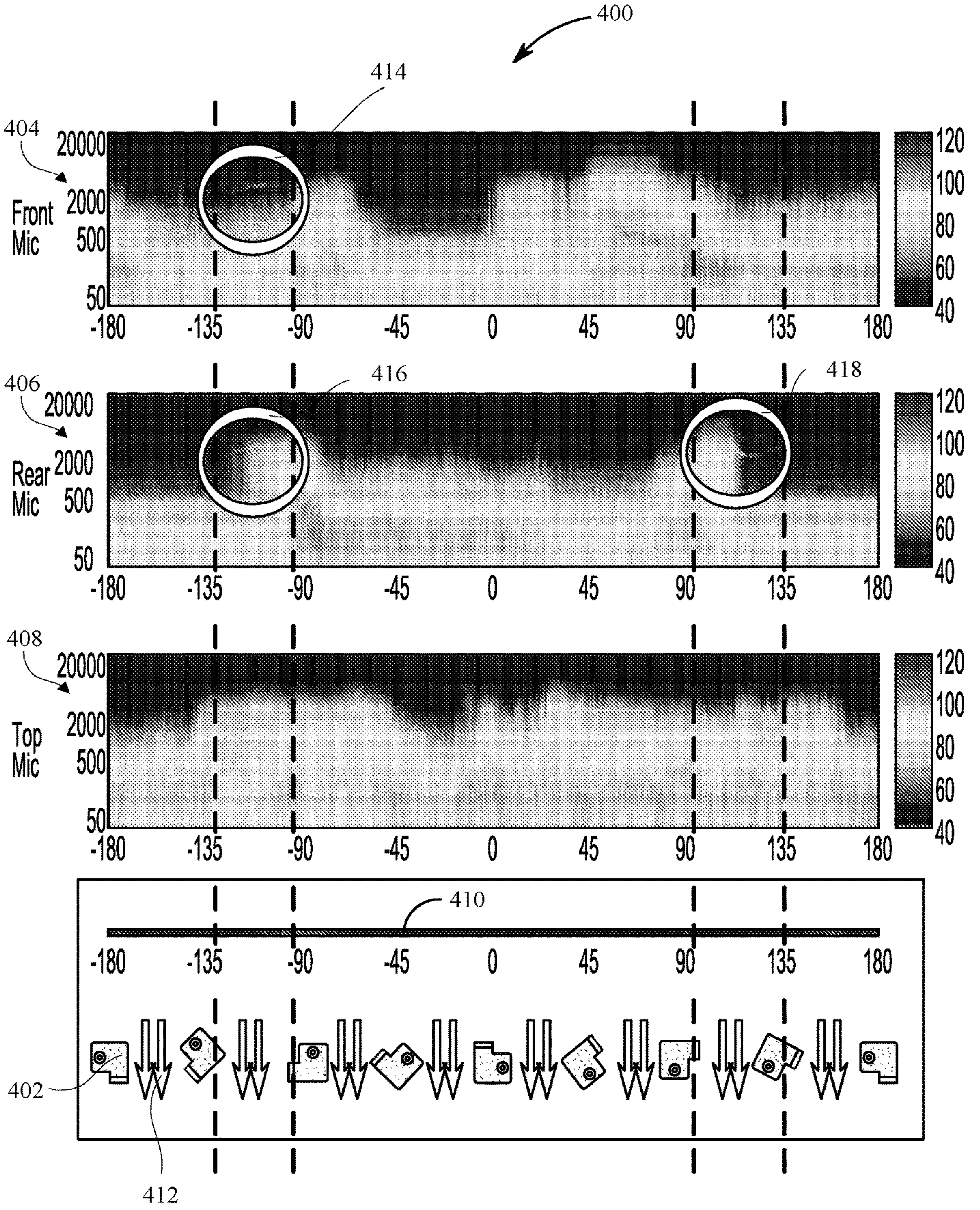
FIG. 4 is a diagram of examples of spectrograms of microphone signals of a device showing detected whistles based on wind direction.

FIG. 4 is a diagram of examples of spectrograms 400 of microphone signals of a device 402 showing detected whistles based on wind direction. The device 402 may be the image capture device 100 show in FIGS. 1A-B or the image capture device 200 shown in FIGS. 2A-B. In this example, the device 402 includes fins (not shown) for heat dissipation on a rear face of the device 402. Referring to FIG. 4, a spectrogram 404 of a front microphone, a spectrogram 406 of a rear microphone, and a spectrogram 408 of a top microphone are shown.

FIG. 4 also shows the angles 410 of the device 402 and wind direction 412 (shown as double arrows) relative to a face of the device 402 across the spectrograms 404-408. As shown, the device 402 is rotated at various degrees around a vertical axis extending through the body of the device 402. The lens of the device 402 is disposed on the front face of the device 402. The rear face of the device 402 is diametrically opposed to the front face of the device 402. The side faces of the device 402 are substantially perpendicular to the front and rear faces of the device 402. When the device 402 is at an angle of −180 degrees, the wind direction 412 is towards the rear face of the device 402. When the device 402 is at an angle of −135 degrees, the wind direction 412 is at an angle towards the rear face of the device 402. When the device 402 is at an angle of −90 degrees, the wind direction 412 is towards a side face of the device 402. When the device 402 is at an angle of −45 degrees, the wind direction 412 is at an angle towards the front face of the device 402. When the device 402 is at an angle of 0 degrees, the wind direction 412 is towards the front face of the device 402. When the device 402 is at an angle of 45 degrees, the wind direction 412 is at an angle towards the front face of the device 402. When the device 402 is at an angle of 90 degrees, the wind direction 412 is towards another side face of the device 402. When the device 402 is at an angle of 135 degrees, the wind direction 412 is at an angle towards the rear face of the device 402. When the device 402 is at an angle of 180 degrees, the wind direction 412 is towards the rear face of the device 402.

Each of the spectrograms 404-408 show sound pressure levels (SPLs) across a frequency range of 0-20,000 Hz. Examples of a detected whistle are visible as faint lines 414-418 (shown inside white circles) when the wind direction 412 is between certain angles across the fins on the rear face of the device 402. As can be seen, while the whistle is most notable in the rear microphone signal, it is also present in the front microphone signal. Detection of a whistle is based on detecting a coherence value between two or more microphones being above a threshold. The measure of the coherence value may be in the frequency domain.

Figure 5B:
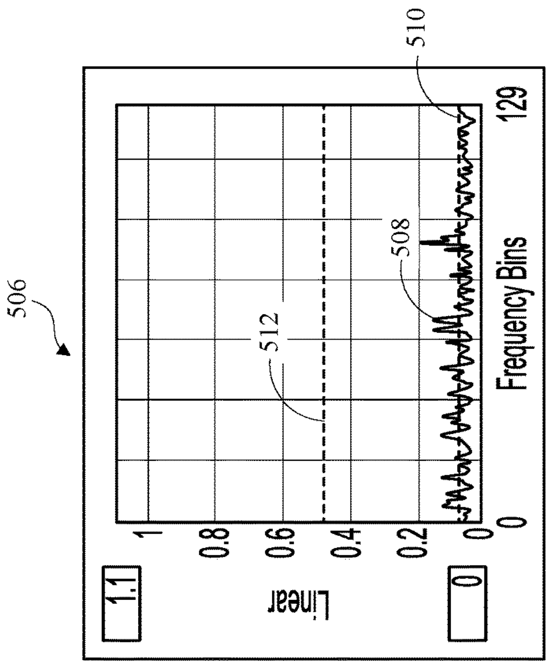
FIGS. 5A-D are diagrams of examples of plots that show a correlation of coherence values and a whistle.
Figure 5A:
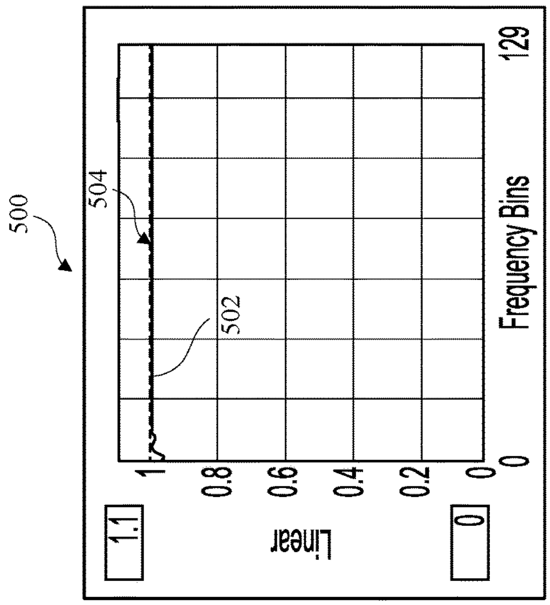
Figure 5D:
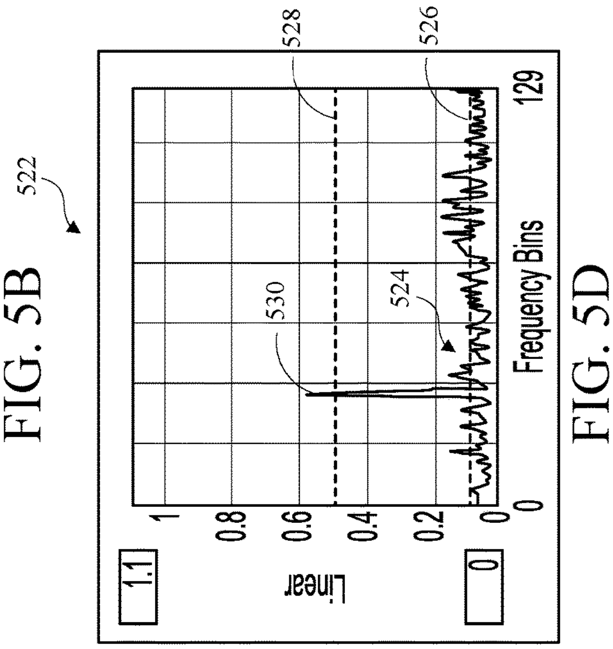

FIGS. 5A-D are diagrams of examples of plots that show a correlation of coherence values and a whistle. FIG. 5A shows an example of a plot 500 of coherence values 502 where there is coherence between two or more microphone signals across the frequency band, which is grouped into frequency bins. In this example, the coherence values 502 across the frequency band are 1, indicating that there is coherence between the two or more microphone signals. Since there is coherence between the two or more microphone signals across the frequency band, the average of the coherence values 504 (shown as a dashed line) is the same as the coherence values 502, i.e., 1. No whistle is detected in this example based on a determination that there is coherence between the two or more microphone signals across the frequency band.

FIG. 5B shows an example of a plot 506 of coherence values 508 where there is no coherence between two or more microphone signals across the frequency band, which is grouped into frequency bins. The plot 506 includes an average 510 of the coherence values 508 across the frequency band and a threshold 512. The threshold 512 may be a value at which no whistle is perceptible to a human ear. In this example, the average 510 of the coherence values 508 is approximately 0.05 and the threshold 512 is approximately 0.5. The threshold 512 may be determined empirically or by using a machine learning (ML) algorithm. The threshold 512 may be learned offline using the ML algorithm and a training set of whistle and non-whistle data. In some examples, the threshold 512 may be continuously learned and updated in real-time to tailor the whistle detection to a user's specific preferred uses. In this example, the threshold 512 is shown as a single value, however, in some examples, the threshold 512 may be a discrete value per frequency bin to allow the whistle detection algorithm to be more or less sensitive at certain frequencies. In this example, none of the frequency bins have a coherence value that meets or exceeds the threshold 512. No whistle is detected in this example based on a determination that none of the frequency bins have a coherence value that meets or exceeds the threshold 512.

Figure 5C:
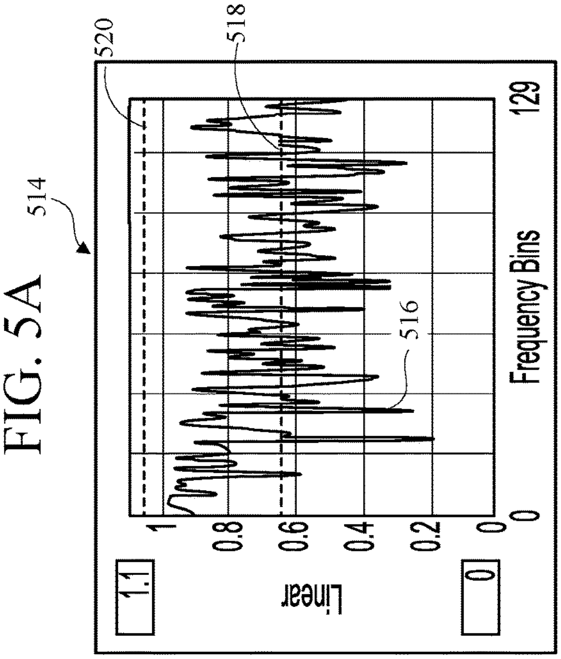

FIG. 5C shows an example of a plot 514 of coherence values 516 where there is a mix of coherence between two or more microphone signals across the frequency band, which is grouped into frequency bins. The plot 514 includes an average 518 of the coherence values 516 across the frequency band and a threshold 520. In this example, the average 510 of the coherence values 516 is approximately 0.65 and the threshold 520 is approximately 1.1. The threshold 520 may be determined empirically or by using an ML algorithm. The threshold 520 may be learned offline using the ML algorithm and a training set of whistle and non-whistle data. In some examples, the threshold 520 may be continuously learned and updated in real-time to tailor the whistle detection to a user's specific preferred uses. In this example, the threshold 520 is shown as a single value, however, in some examples, the threshold 520 may be a discrete value per frequency bin to allow the detector to be more or less sensitive at certain frequencies. In this example, none of the frequency bins have a coherence value that meets or exceeds the threshold 520. No whistle is detected in this example based on a determination that none of the frequency bins have a coherence value that meets or exceeds the threshold 520.

FIGS. 5A-C are example plots where no whistle is present. By way of contrast, FIG. shows an example of a plot 522 of coherence values 524 where there is a whistle present. The plot 522 includes an average 526 of the coherence values 524 across the frequency band, which is grouped into frequency bins, and a threshold 528. In this example, the average 526 of the coherence values 524 is approximately 0.1 and the threshold 528 is approximately 0.5. The threshold 528 may be determined empirically or by using an ML algorithm. The threshold 528 may be learned offline using the ML algorithm and a training set of whistle and non-whistle data. In some examples, the threshold 528 may be continuously learned and updated in real-time to tailor the whistle detection to a user's specific preferred uses. In this example, the threshold 528 is shown as a single value, however, in some examples, the threshold 528 may be a discrete value per bin to allow the detector to be more or less sensitive at certain frequencies. In this example, the whistle presents as an elevated coherence value 530 for one or more bins (e.g., bin 30) in an otherwise uncorrelated frequency band. In addition to detecting the presence of the whistle, it can be seen from plot 522 in which bins (e.g., bin 30) the whistle occurs.

FIG. 6 is a flow diagram of an example of a method 600 for whistle detection. The method 600 may be implemented by a device, such as the device 402 shown in FIG. 4. At 602, the method 600 includes obtaining a first microphone signal. The first microphone signal is obtained from a first microphone of the device.

At 604, the method 600 includes obtaining a second microphone signal. The second microphone signal is obtained from a second microphone of the device. The first and second microphones may be disposed on different faces of the device. For example, the first microphone may be disposed on a front face of the device and the second microphone may be disposed on a rear face, side face, or top face of the device. In another example, the first microphone may be disposed on a top face of the device and the second microphone may be disposed on a front face, rear face, or side face of the device.

At 606, the method 600 includes measuring coherence values between the first microphone signal and the second microphone signal. The coherence values may be measured across a frequency band, such as, for example, approximately 20 Hz to approximately 20 kHz. In some examples, the coherence values may be measured across a frequency band that is approximately 0 Hz to approximately 12 kHz. The frequency band may be grouped into frequency bins, and a coherence value may be determined for each frequency bin. Each frequency bin has a width, for example, 93.75 Hz. The width of the frequency bins can be adjusted to any width based on a desired level of sensitivity. The coherence value of each frequency bin is compared against an average of the coherence values across the frequency band.

At 608, the method 600 includes detecting an elevated coherence value in a frequency bin. In some examples, an elevated coherence value may be detected in one or more neighboring frequency bins as well. The elevated coherence value indicates a presence of a whistle when the elevated coherence value is above a threshold. The whistle may be detected in a frequency domain. In an example, the threshold may be a value that is empirically determined based on the average of the coherence values across the frequency band. In another example, the threshold may be a value that is learned offline using an ML algorithm and a training set of whistle and non-whistle data. In some examples, the threshold may be continuously learned and updated in real-time to tailor the whistle detection to a user's specific preferred uses. In some examples, the threshold may be a single value across the frequency band, and in other examples, the threshold may be a discrete value per bin to allow the detector to be more or less sensitive at certain frequencies.

At 610, the method 600 includes attenuating the frequency bin to reduce the detected whistle. The frequency bin is attenuated based on a determination that the elevated coherence value is above the threshold. Examples of whistle attenuation methods are discussed with respect to FIG. 7 and FIG. 8.

Figure 7:
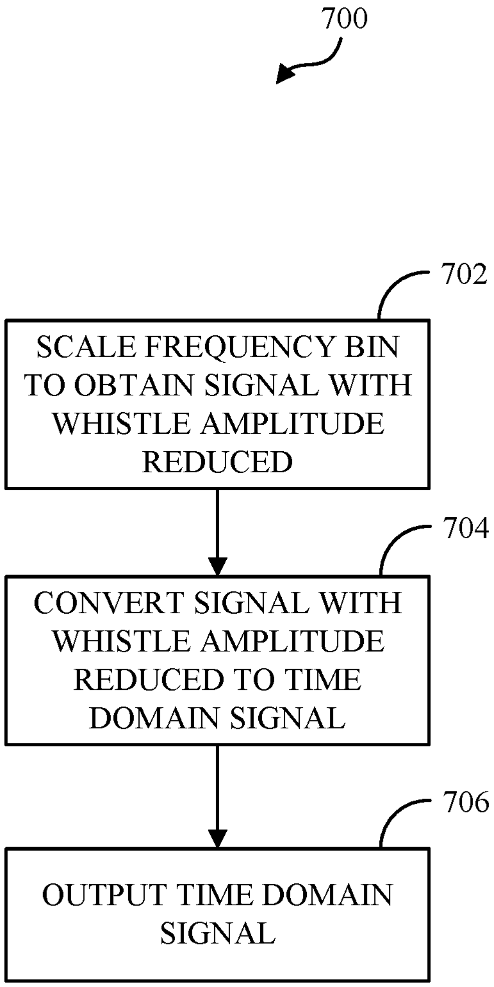
FIG. 7 is a flow diagram of an example of a method for whistle attenuation in a frequency domain.

FIG. 7 is a flow diagram of an example of a method 700 for whistle attenuation in a frequency domain. The method 700 may be implemented by a device, such as the device 402 shown in FIG. 4. At 702, the method 700 includes scaling a frequency bin in which an elevated coherence value was detected to be above a threshold, such as the frequency bin 530 shown in FIG. 5D. The scaling of the frequency bin in which an elevated coherence value is detected to be above the threshold reduces the detected whistle such that it is masked by the remaining audio (i.e., general wind sound). The result of the scaling is to obtain a signal with the whistle amplitude reduced for the frequency bin.

At 704, the method 700 includes converting the signal with the whistle amplitude reduced to a time domain signal. The signal with the whistle amplitude reduced may be converted to a time domain signal using an inverse fast Fourier transform (FFT). The signal with the whistle amplitude reduced is converted to a time domain signal in order to make the signal with the whistle amplitude reduced listenable.

At 706, the method 700 includes outputting the time domain signal. The time domain signal may be output for further processing. Further processing of the time domain signal may include dynamics processing, such as adding gain, additional filtering in the time domain, or both.

Figure 8:
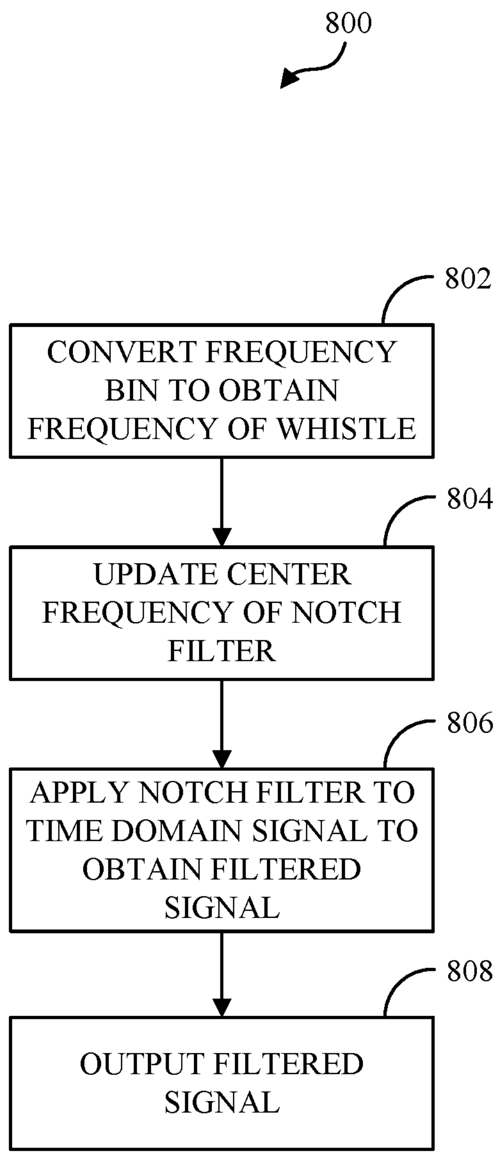
FIG. 8 is a flow diagram of an example of a method for whistle attenuation in a time domain.

FIG. 8 is a flow diagram of an example of a method 800 for whistle attenuation in a time domain. The method 800 may be implemented by a device, such as the device 402 shown in FIG. 4. At 802, the method 800 includes converting a frequency bin in which an elevated coherence value was detected to be above a threshold, such as the frequency bin 530 shown in FIG. 5D, to obtain a frequency of a whistle. Converting the frequency bin may include converting the bin number of the frequency bin in which an elevated coherence value was detected to be above a threshold to a frequency by multiplying the bin number by the bin width.

At 804, the method 800 includes updating a center frequency of a notch filter. For every block of data, it is determined whether a whistle is detected and in which frequency bin it occurred. A new value of whether a whistle was detected or not and a frequency bin in which it occurred is determined at an interval, such as 5 ms. The center frequency of the notch filter can be updated based on the determination of whether a whistle occurred at each interval to track whether the whistle is moving. Updating the center frequency of the notch filter may include updating harmonics, if needed.

At 806, the method 800 includes applying the notch filter to the time domain signal to obtain a filtered signal. The notch filter is used to attenuate one or more frequencies. Applying the notch filter may include applying weights to the time domain signal at one or more frequencies. For example, weights can be applied to one or more frequencies in which a whistle is detected to reduce the whistle such that it is masked by the remaining audio (i.e., general wind sound).

At 808, the method 800 includes outputting the filtered signal. The filtered signal may be output for further processing. Further processing of the time domain signal may include dynamics processing, such as adding gain, additional filtering in the time domain, or both.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device, comprising:

a first microphone;

a second microphone; and a processor configured to:

obtain a first microphone signal from the first microphone;

obtain a second microphone signal from the second microphone;

measure coherence values between the first microphone signal and the second microphone signal across a frequency band, wherein the frequency band comprises frequency bins and a coherence value is measured for each frequency bin;

detect an elevated coherence value in at least one of the frequency bins, wherein the elevated coherence value indicates a presence of a whistle; and attenuate the first microphone signal over the at least one frequency bin based on a determination that the elevated coherence value is above a threshold.

2. The image capture device of claim 1, wherein the elevated coherence value is detected in a frequency domain.

3. The image capture device of claim 2, wherein the processor is further configured to:

scale the first microphone signal over the at least one frequency bin to obtain a reduced signal, wherein the reduced signal is a signal that has a reduced whistle amplitude;

convert the reduced signal into a time domain signal; and output the time domain signal.

4. The image capture device of claim 3, wherein the processor is further configured to:

convert the at least one frequency bin to obtain a frequency of the whistle;

update a center frequency of a notch filter based on the frequency of the whistle;

apply the notch filter to the time domain signal to obtain a filtered signal; and output the filtered signal.

5. The image capture device of claim 1, wherein the coherence value of each frequency bin is compared against an average coherence value across the frequency band.

6. The image capture device of claim 1, wherein the threshold is based on an empirical determination or a machine learning algorithm.

7. The image capture device of claim 1, wherein each frequency bin has a width of 93.75 Hz.

8. A method, comprising:

obtaining a first microphone signal from a first microphone;

obtaining a second microphone signal from a second microphone;

measuring coherence values between the first microphone signal and the second microphone signal across a frequency band, wherein the frequency band comprises frequency bins and a coherence value is measured for each frequency bin;

detecting an elevated coherence value in at least one of the frequency bins, wherein the elevated coherence value indicates a presence of a whistle; and attenuating the first microphone signal over the at least one frequency bin based on a determination that the elevated coherence value is above a threshold.

9. The method of claim 8, wherein the elevated coherence value is detected in a frequency domain.

10. The method of claim 9, further comprising:

scaling the first microphone signal over the at least one frequency bin to obtain a reduced signal, wherein the reduced signal is a signal that has a reduced whistle amplitude;

converting the reduced signal into a time domain signal; and outputting the time domain signal.

11. The method of claim 10, further comprising:

converting the at least one frequency bin to obtain a frequency of the whistle;

updating a center frequency of a notch filter based on the frequency of the whistle;

applying the notch filter to the time domain signal to obtain a filtered signal; and outputting the filtered signal.

12. The method of claim 8, further comprising:

comparing the coherence value of each frequency bin against an average coherence value across the frequency band.

13. The method of claim 8, wherein the threshold is based on an empirical determination or a machine learning algorithm.

14. The method of claim 8, wherein each frequency bin has a width of 93.75 Hz.

15. A non-transitory computer-readable medium comprising instructions, that when executed by a processor, cause the processor to:

measure coherence values between a first microphone signal and a second microphone signal across a frequency band, wherein the frequency band comprises frequency bins and a coherence value is measured for each frequency bin;

detect an elevated coherence value in at least one of the frequency bins, wherein the elevated coherence value indicates a presence of a whistle; and attenuate the first microphone signal over the at least one frequency bin based on the elevated coherence value.

16. The non-transitory computer-readable medium of claim 15, wherein the processor is further configured to:

scale the first microphone signal over the at least one frequency bin to obtain a reduced signal, wherein the reduced signal is a signal that has a reduced whistle amplitude;

convert the reduced signal into a time domain signal; and output the time domain signal.

17. The non-transitory computer-readable medium of claim 16, wherein the processor is further configured to:

convert the at least one frequency bin to obtain a frequency of the whistle;

update a center frequency of a notch filter based on the frequency of the whistle;

apply the notch filter to the time domain signal to obtain a filtered signal; and output the filtered signal.

18. The non-transitory computer-readable medium of claim 15, wherein the coherence value of each frequency bin is compared against an average coherence value across the frequency band.

19. The non-transitory computer-readable medium of claim 15, wherein the at least one frequency bin of the first microphone signal is attenuated based on a determination that the elevated coherence value is above a threshold.

20. The non-transitory computer-readable medium of claim 15, wherein each frequency bin has a width of 93.75 Hz.

* * * * *